United States Patent [19]

Bender et al.

[11] Patent Number: 5,279,784
[45] Date of Patent: Jan. 18, 1994

[54] METHOD OF FABRICATION OF COMPOSITE TIRE THREAD

[75] Inventors: David L. Bender; William H. Brugman; Floyd S. Myers, all of Muscatine, Iowa

[73] Assignee: Bandag Licensing Corporation, Muscatine, Iowa

[21] Appl. No.: 878,480

[22] Filed: May 5, 1992

[51] Int. Cl.5 .................. B29C 39/10; B29C 45/14
[52] U.S. Cl. ...................... 264/236; 156/128.1; 264/36; 264/259; 264/325; 264/328.2; 264/347
[58] Field of Search .............. 156/128.1, 123, 124, 156/910; 264/36, 259, 325, 326, 328.3, 236, 347, 328.2

[56] References Cited

U.S. PATENT DOCUMENTS

| | | | |
|---|---|---|---|
| 2,724,425 | 11/1955 | Ostling | 264/328.3 |
| 2,873,790 | 2/1959 | Cadwell et al. | 264/328.3 |
| 3,880,810 | 4/1975 | Hausch et al. | 156/910 |
| 3,916,072 | 10/1975 | Hausch et al. | 156/910 |
| 3,925,590 | 12/1975 | Hausch et al. | 156/910 |
| 4,257,836 | 3/1981 | Beneze | 264/259 |
| 4,921,673 | 5/1990 | Holroyd et al. | 264/259 |

Primary Examiner—Jeffery Thurlow
Assistant Examiner—Mathieu Vargot
Attorney, Agent, or Firm—Nixon & Vanderhye

[57] ABSTRACT

Method for forming a composite elastomer tire tread by applying a heat curable liquid elastomer mixture to a thin rubber sheet and curing the liquid mixture to form the composite tire tread. A tire retreaded with such a composite tire elastomer tread is also described.

20 Claims, 3 Drawing Sheets

METHOD OF FABRICATION OF COMPOSITE TIRE THREAD

The present invention relates to a method for producing composite tire treads and to tires retreaded therewith. More particularly, the present invention is directed to a composite tire tread in which a polyurethane tire tread is bonded to a thin rubber sheet and to its fabrication.

BACKGROUND OF THE INVENTION

It is well known to retread tires by bonding rubber tire tread to tire casings. However, truck tires and off-the-road tires, for example those used on construction, mining and all-terrain vehicles, are subject to extreme conditions, giving rise to rapid wear of the tread and increased frequency of tire replacement.

There is a need therefore to develop a tire tread structure having improved wear characteristics, especially in extreme off-the-road conditions. The present invention seeks to provide such an improved tire tread structure.

SUMMARY OF THE INVENTION

It has been found that, in certain applications, improved tire tread wear properties are obtained if a polyurethane tire tread is employed instead of a conventional rubber tire tread. However, cured polyurethane does not bond easily to rubber, and this has led the present inventors to the development of a structure which will facilitate acceptable bonding of a polyurethane tread to a rubber tire casing.

It has been found, according to the present invention, that a polyurethane tread can be effectively bonded to a rubber tire casing by using a composite tire tread in which a polyurethane tread is cured in contact with and as a consequence is bonded to a thin rubber backing layer which facilitates bonding of the tread composite to a tire casing.

In accordance with one aspect of the present invention, there is provided a method for forming a composite elastomer tire tread which can be readily bonded to a rubber tire casing. The method comprises the steps of applying a heat curable liquid elastomer mixture to a solid rubber sheet and curing the liquid mixture to form the composite tire tread.

According to another aspect of the invention, there is provided a composite elastomer tire tread comprising a cured elastomeric tread adhered to a rubber sheet.

According to a further embodiment, there is provided the process for producing a treaded tire, comprising applying to a tire casing a composite tire tread of the invention.

In yet a further embodiment, there is provided a retreaded tire produced by the process of applying to a tire casing a composite tire tread of the invention.

In a preferred embodiment, the method of the invention comprises placing a thin rubber sheet in a first part of a two-part mold, with the second mold part containing a tire tread mold, closing the first and second mold parts to form a mold chamber and introducing a liquid curable elastomer mixture into the chamber. The curable mixture is then cured in the mold to form the composite tire tread. Post-curing of the cured composite tread may then be carried out, if desired.

BRIEF DESCRIPTION OF THE DRAWINGS

The invention will now be described in more detail with reference to the accompanying drawings, in which.

DETAILED DESCRIPTION OF THE INVENTION

Figure 1:
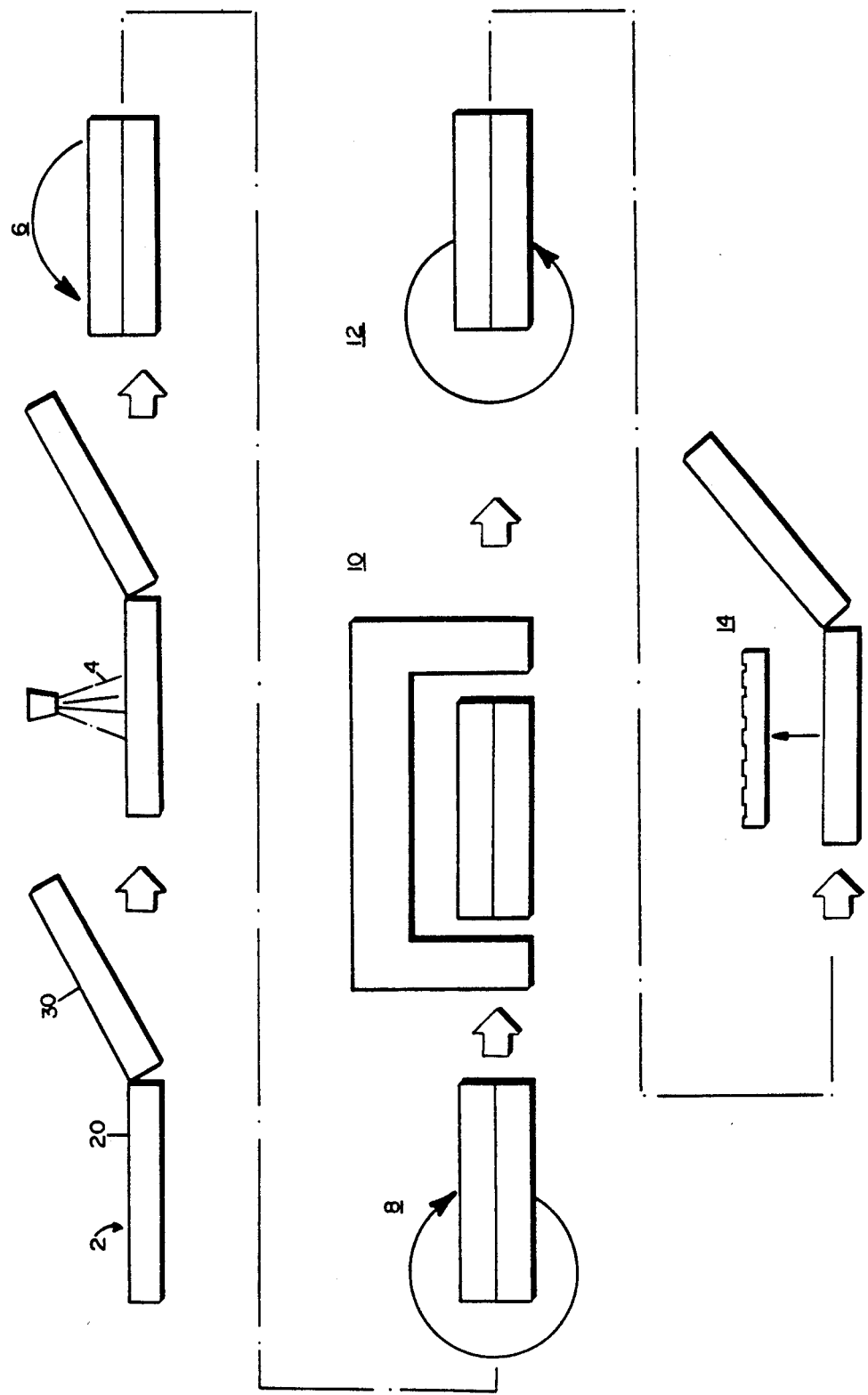
FIG. 1 is a schematic illustration of the method of the invention.

Referring to FIG. 1, there is shown a general schematic illustration of the method of the invention. At 2 there is shown a mold 20 in the open configuration with a thin rubber sheet 30 adhered to the top portion of the mold. A liquid curable elastomeric composition 4 is then introduced and the mold is closed as shown at 6. The mold is then inverted as shown at 8 and placed into a pressure autoclave as shown at 10. Curing is effected in the autoclave at elevated temperture and pressure after which the mold is allowed to cool and re-inverted as shown at 12. The mold is then opened as shown at 14 to permit removal of the composite tire tread.

Figure 2:
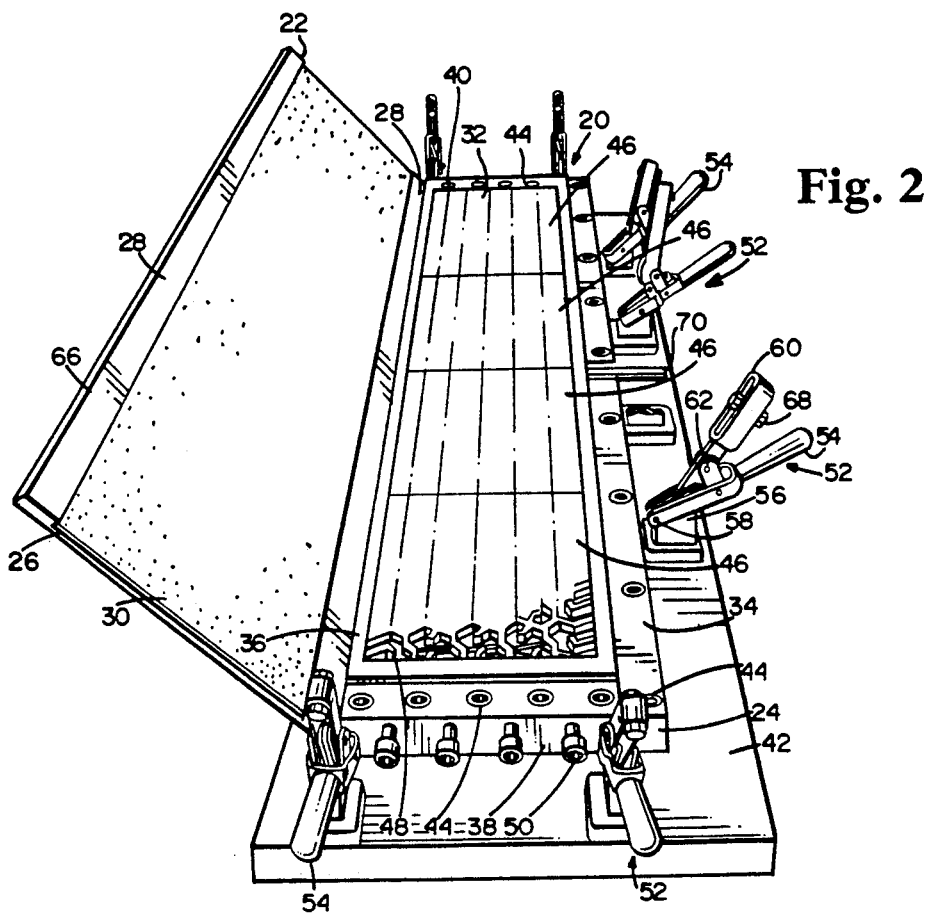
FIG. 2 is an elevational view of a mold used in the method of the invention in its open configuration.

Turning to FIG. 2, there is shown a two-part metal mold, generally referenced 20, in the open configuration having a first mold part 22 and a second mold part 24. The first mold part 22 is provided with a generally flat recess 26 defining lands 28 extending longitudinally on either side of the recess. The purpose of the recess 26 is to receive a rubber sheet 30 which will form the thin rubber backing layer of the composite tire tread to be formed in the mold.

The second mold part 24 comprises a mold section 32 having a frame defined by side lands 34, 36 and end members 38, 40. The side lands 34, 36 and the end members 38, 40 are permanently mounted to a base 42 by bolts 44. A plurality (typically four) of mold parts 46 each having a tire mold design 48 are disposed in the frame, and are urged into abutting relationship with respect to each other and against the end member 40 by bolts 50 extending through the end member 38 and into abutting relationship with the adjacent mold part 46.

The mold 20 is brought into the closed configuration (shown in FIG. 5) by clamping with clamps 52 the first and second mold parts together in abutting overlying engagement with respect to each other to form a mold chamber. Each of the clamps 52 comprises a handle 54 pivotally mounted to a base 56 at a pivot point 58. A clamping member 60 is mounted both to the base 56 and to the handle 54 at pivot points 58 and 62 respectively. Clamping is effected by movement of each of the handles 54 towards the mold 20 which causes downward arcuate movement of the clamping member 60 into abutting relationship with the upper surface 66 (see FIG. 5) of the second part 22. To adjust the clamping force exerted on the upper surface 66, each clamping member 60 is provided with an adjustment screw 68.

Liquid elastomeric curable material can be introduced into the open mold by pouring from a suitable dispenser. Alternatively, the mold 20 is provided with an entry conduit 70 to facilitate injection molding introduction of liquid elastomeric material into the mold when closed. This entry conduit preferably extends through the mid-point of side land 34 to define a flow path into the mold parts 46.

The thin rubber sheet 30 is typically 1/16 to ½ inch in thickness, more usually about ⅛ of an inch thick, and has a length depending on the mold size. There is no limit on the mold length other than practical restraints depending on the size of the fabrication location (for example up to 30 feet in length). Typically, for the mold illustrated in the drawings, the rubber sheet will have a length of about 54 inches and a width of about 12 inches. The rubber sheet may be of natural rubber, synthetic rubber or a mixture of natural and synthetic rubbers.

Prior to placement in the recess 26, the rubber sheet is roughened on the side which will contact the curable material using a conventional buffing technique. This buffing procedure cleans the surface and provides a roughened surface to enhance bonding with the tread material.

The buffed surface of the rubber sheet is then primed using a suitable priming technique. For example, as priming agent there may be used a halogen-containing priming agent. Typically, the priming agent is a halogen-containing oxidizing agent selected from various N-halohydantoins, N-halosulfonamides, N-haloamides and N-haloimides, and combinations thereof. Examples of suitable N-halohydantoins include 1,3-dichloro-5,5-dimethylhydantoin, 1,3-dibromo-5,5-dimethylhydantoin, 1,3-dichloro-5-methyl-5-isobutylhydantoin, and 1,3-dichloro-5-methyl-5-hexylhydantoin. Examples of suitable N-halosulfonamides are N,N,N',N'-tetrachlorooxybis(benzene sulfonamide); N,N,N',N'-tetrachloro-4,4-biphenyl disulfonamide, N,N,N',N'-tetrachloro-1-3 benzene disulfonamide, and N,N,N',N'-tetrabromooxybis(benzene sulfonamide). Examples of suitable N-haloamides include N-bromoacetamide and tetrachloroglycoluril. Examples of suitable N-haloimides include N-bromosuccinimide and various mono-, di- and trichloroisocyanuric acids. A preferred priming agent is 1,3-dichloro-5,5-dimethylhydantoin.

It has been reported (see, for example, U.S. Pat. No. 3,456,674) that violent reactions, which may be explosive in nature, may arise if primary or secondary alcohols having 2 to 7 carbon atoms, benzyl alcohol, phenol, lower substituted phenols, primary or secondary amines or lower alkyl sulfoxides are used as solvents for the above-listed halogenated primers. Preferred solvents for the halogenated primers are chlorinated hydrocarbons, such as methylene chloride and 1,1,1-trichloroethylene. Other solvents which can be used are methanol, tertiary butyl alcohol and cyclohexanol.

The priming agent is applied to the buffed surface as a solution in an inert solvent, for example a volatile organic solvent. Examples of suitable organic solvents are dichloromethane, ethyl acetate and acetone. The concentration of the priming agent solution is generally from about 0.1 to 10% by weight, preferably about 0.5 to about 5% by weight, based on the total weight of the solvent and the priming agent. Preferably, the priming agent is a 5 weight percent solution of 1,3-dichloro-5,5-dimethyl hydantoin in dichloromethane. The priming agent rate of application is 0.001 to 0.02 grams per square inch, typically about 0.003 to 0.01 grams per square inch.

The priming agent may be applied using any conventional mode of application, for example brushing or spraying. One coat of the priming agent is generally sufficient, but it is important to ensure that all of the surface has been wetted with the priming agent. Preferably, the priming agent is applied at the rate of about 0.005 to 0.035 grams per square inch, typically about 0.010 to 0.015 grams per square inch. The priming agent solution generally dries within a matter of minutes, to leave the primed surfaces ready for application of the elastomeric material.

The above-described priming method is not the only technique which can be employed. Thus, it is possible to prime the rubber surface by oxidation methods using oxidative reactants which will introduce functional groups upon application to the rubber surface, the type and number depending on reaction conditions and subsequently occurring chemical reactions. In a strict sense, the mechanism is not an "oxidation", but the introduction of oxygen groups are usually facilitated. In the case of some reactants (particularly the mineral acids), other functional groups may be introduced which will enhance the interaction with unreacted urethane. Some of the groups introduced are derived from epoxide, dioxetane (a 4-membered ring with 2 carbons and 2 oxygens), aldehyde, ketone, organic carboxylic acid and alcohol. Reactants which may be used are strong mineral acids such as nitric or sulphuric acid; bases such as sodium hydroxide or potassium hydroxide; peroxides such as hydrogen peroxide or t-butyl hydroperoxide; inorganic oxidants such as potassium permanganate and potassium dichromate; organic acids, such as formic and trifluoroacetic; and peracids such as peroxyacetic and peroxybenzoic acid. Other reactants are singlet oxygen sensitizers such as Rose Bengal, methylene blue and aqueous ozone, reactants which cause addition of halogen such as HBr, HCl, $Cl_2$ and $Br_2$, reactants which cause addition to carbon-carbon unsaturation using R-substituted 1,2,4-triazoline 3,5 diones, where R is methyl, phenyl, butyl or naphthyl; or bis-(p-3,5-dioxo-1,2,4-triazoline-4-yl-phenyl) methane. Priming can also be effected using high energy radiation, including microwave discharge, corona discharge and plasma treatment. The resulting surface modification will depend on the surface chemistry, the gases present and energy level employed.

The primed rubber sheet 30 is then placed in the recess 26 with the primed surface not in contact with the recess. The sheet may be held in position using any convenient means, for example by prior application of a contact cement adhesive to the surface of the rubber sheet to contact the recess, or by the application of vacuum to the recess by an external vacuum means (not shown).

A liquid elastomeric composition is then introduced into the mold parts 46 to slight overfill by pouring the composition in the mold parts from a suitable dispenser disposed above the mold parts. Once introduction of the liquid composition has been completed, the mold is closed by bringing the first mold part 22 into overlying relationship with the second mold part 24 so that the rubber sheet 30 in the recess 26 covers the mold parts 46. At this point, any excess of the liquid composition is squeezed out of the sides of the mold and ensures good contact of the liquid with the rubber sheet. The mold is clamped in its closed configuration by bringing each of the clamps 52 into the clamping configuration by moving the handles 54 towards the mold so that the clamping members 60 come into clamping engagement with the upper surface 66 of the first mold part 22.

As the described above, the polyurethane composition may be poured into the open mold under non-pressure conditions. It will be appreciated, however, that the mold may be first closed and the composition then introduced in the closed mold by injection molding through the entry conduit 70.

Figure 5:
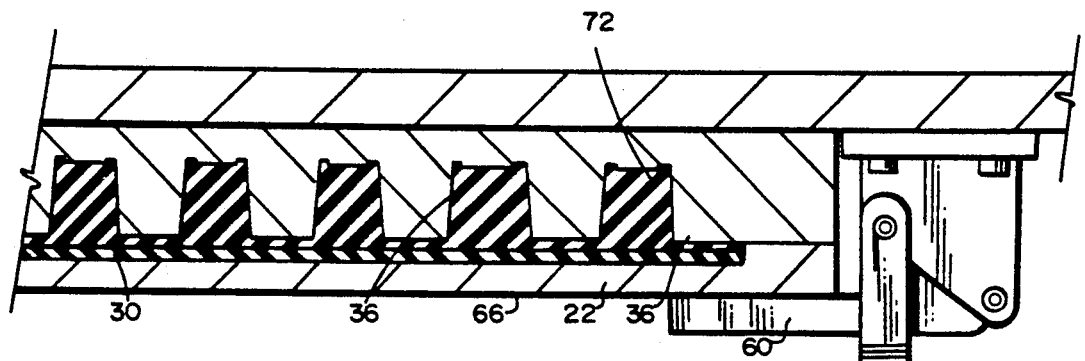
FIG. 5 is a partial cross-section of the mold in its inverted closed position.

The mold is then inverted to the configuration shown in FIG. 5 wherein the thin rubber sheet 30 is below the liquid elastomeric composition filling the spaces in the mold parts 46. While inversion of the mold is not critical to achieving the desired composite tire tread, inversion allows any trapped gases such as air in the liquid elastomer composition to rise to the upper surface of the tire treads 72, thereby avoiding the creation of voids in the area of the interface between the liquid composition and the rubber sheet 30. Inversion of the mold is not necessary when the liquid elastomeric composition is introduced into the mold using the injection molding approach.

The liquid composition is then cured in the mold. Preferably, this is carried out at elevated temperature and, optionally, under pressure in a pressure autoclave. Typically the elevated temperature is in the region of 212° F. to 230° F. (100° C. to 110° C.), and the elevated pressure is in the region of 80 to 90 PSI relative.

The curing phase typically takes from 1 to 4 hours, usually about 3 hours. Upon completion of curing, the mold is removed from the pressure autoclave and allowed to cool. The mold is then inverted so that the first mold part is again above the second mold part and the mold is opened by moving the clamps 52 to the open position and moving the first mold part 22 to its open configuration as shown in FIG. 2. The composite tire tread is then removed from the mold and any of the rubber sheet protruding around the sides of the tread removed. A post-cure step then carried out at an elevated temperature, typically 85° to 110° C., more usually about 100° C. for a suitable period of time, typically 1 to 24 hours, for example 2 to 20 hours.

The liquid curable elastomer composition may be selected from a polyurethane composition, an acrylate composition, an epoxy composition, a liquid rubber composition, and mixtures thereof. A preferred polyurethane composition is commercially available and comprises a 50/50 by weight mixture of Adiprenes L-42 and L-367 (toluene diisocyanate prepolymers manufactured by Uniroyal) and Caytur 21 (an aromatic diamine blocked with sodium chloride). The composition may optionally contain conventional additives such as sulphur, zinc oxide, rubber accelerators, stearic acid to dissolve the zinc oxide, catalysts to increase the cure rate, and fillers such as silica, carbon black and plasticizers.

In the situation where polyurethane is used as the liquid curable material, the entire tread portion of the composite tire tread is comprised of cured polyurethane. When the composite tire tread is used to retread a tire casing (discussed in more detail below), the tire tread is wrapped around the casing and the polyurethane ends bonded to each other using a suitable polyurethane or epoxy adhesive. If it is desired to use an adhesive for bonding rubber to rubber then, as an alternative embodiment, it is possible, prior to closing the mold, to introduce tread portions composed of rubber at each end of the mold so that the resulting composite tire tread consists of a polyurethane tread center portion and rubber tread end portions. This structure, by virtue of the rubber end portions, enables the use of an adhesive suitable for bonding rubber to rubber rather than a polyurethane or epoxy adhesive.

Figure 3:
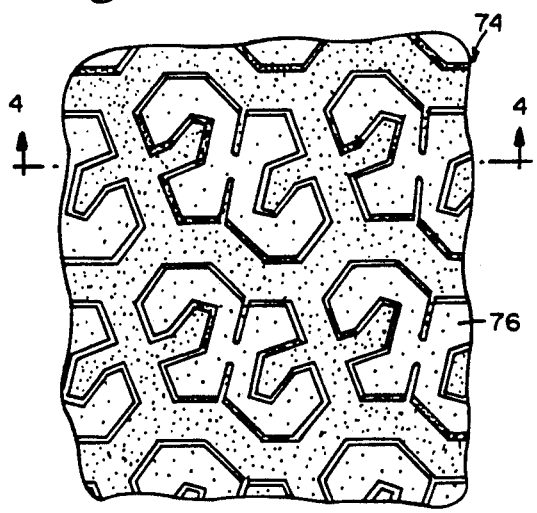
FIG. 3 is a plan view of a suitable tread pattern for the composite tire tread.
Figure 4:
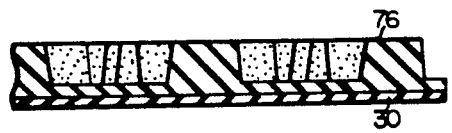
FIG. 4 is a cross-sectional view along the line 4—4 of FIG. 3.

A composite tire tread 74 of the invention is shown in FIGS. 3 and 4. The rubber backing layer 30 is shown in FIG. 4 bonded to the cured tread 76.

Figure 6:
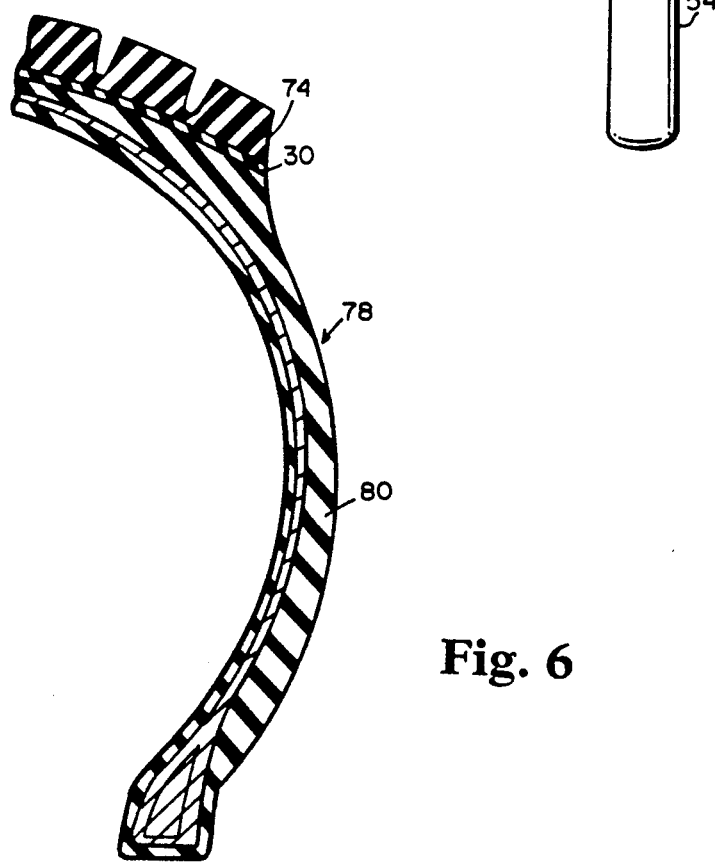
FIG. 6 is a partial cross-section of a tire having a composite tire tread of the invention mounted thereon.

FIG. 6 is a partial cross-section of a tire 78 with a composite tire tread 74 of the invention bonded to a tire casing 80. Because of the rubber backing layer on the composite tire tread of the invention, it is possible to bond the tread to a conventional tire casing formed from a rubber compound cured according to conventional techniques. Such rubber compounds contain olefinic unsaturation in their polymer chains, and include natural rubber, synthetic polyisoprene, polybutadiene, butadiene-isoprene copolymers, rubbery copolymers of butadiene and styrene, rubbery copolymers of butadiene and acrylonitrile, rubbery copolymers of isoprene and isobutylene, polychloroprene, ethylene-proplylene rubbers, and the like.

The term "natural rubber" as used herein means an elastomeric substance obtained from various trees and plants which generally grow in the tropics or desert portions of the world. Natural rubber contains a very high cis content, typically in excess of 90% or more, of cis-1-4-polyisoprene.

A major advantage arising from the present invention is that, because of the rubber backing layer, the composite tire tread can be bonded to the rubber tire casing using any adhesive system suitable for bonding rubber to rubber. A suitable retreading technique and two possible adhesive systems which may be used are described below.

Visible surface moisture on the casing is removed. The tire casing is then allowed to equilibrate at ambient indoor temperature and humidity for a period of time, typically about 10 to 15 hours.

The surface of the casing onto which the composite tread is to be bonded is then subjected to a conventional buffing procedure in order to clean the surface and provide a roughened surface to enhance bonding with the composite tread. As with the buffing of the rubber sheet, the buffing is carried out using conventional tire buffing equipment, and is continued until the desired buffing depth and casing surface radius are obtained, in accordance with predetermined tire specifications. The outer surface of the rubber sheet of the composite tire tread is also subjected to buffing to clean the surface of any contaminants and to roughen the surface.

After completion of the buffing process, holes or damage to the casing are repaired. After the casing has been repaired, the tread and casing may be bonded directly together using commercially available "cushion" adhesive. Alternatively, the surfaces to be bonded together may be first subjected to a priming treatment to facilitate the use of an alternative bonding system employing a heat-curable polyurethane adhesive composition, as described in U.S. Pat. No. 4,390,678, the disclosure of which is hereby incorporated by reference.

Referring to the "cushion" approach, this involves the use of a sheet of solid adhesive rubber, typically of natural rubber optionally containing about 5 to 25 weight percent of synthetic rubber. The cushion is applied to the rubber sheet of the composite tire tread and trimmed to size. Prior to the application of the cushion material, it is usually desirable to apply a thin coat of a rubber formulation dispersed in a suitable solvent and commonly referred to as "cement". The cement facilitates the adhering of the tread and the casing to the cushion by acting as a contact adhesive and aids in preserving the integrity of the rubber surfaces. The resulting "cushioned" tire tread is then applied to the tire casing and the tire/tread combination subjected to curing, as described later.

When the alternative approach is followed, priming of the surfaces to be bonded is first carried out. The priming treatment preferably involves applying to the casing and the tread a halogen-containing oxidizing agent selected from various N-halohydantoins, N-halosulfonamides, N-haloamides and N-haloimides, and combinations thereof. Examples of suitable N-halohydantoins include 1,3-dichloro-5,5-dimethylhydantoin, 1,3-dibromo-5,5-dimethylhydantoin, 1,3-dichloro-5-methyl-5-isobutylhydantoin, and 1,3-dichloro-5-methyl-5-hexylhydantoin. Examples of suitable N-halosulfonamides are N,N,N',N'-tetrachlorooxybis(benzene sulfonamide); N,N,N',N'-tetrachloro-4,4-biphenyl disulfonamide, N,N,N',N'-tetrachloro-1-3 benzene disulfonamide, and N,N,N',N'-tetrabromooxybis(benzene sulfonamide). Examples of suitable N-haloamides include N-bromoacetamide and tetrachloroglycoluril. Examples of suitable N-haloimides include N-bromosuccinimide and various mono-, di- and trichloroisocyanuric acids. A preferred priming agent is 1,3-dichloro-5,5-dimethylhydantoin.

The priming agent is applied to the buffed surfaces of the casing and the tread as a solution in an inert solvent, for example a volatile organic solvent. Examples of suitable organic solvents are dichloromethane, ethyl acetate and acetone. The concentration of the priming agent solution is generally from about 0.1 to 10% by weight, preferably about 0.5 to about 5% by weight, based on the total weight of the solvent and the priming agent. Preferably, the priming agent is a 5 weight percent solution of 1,3-dichloro-5,5-dimethylhydantoin in dichloromethane. The priming agent rate of application is 0.001 to 0.02 grams per square inch, typically about 0.003 to 0.01 grams per square inch.

The priming agent may be applied to the casing and the tread using any conventional mode of application, for example brushing or spraying. One coat of the priming agent is generally sufficient, but it is important to ensure that all of the substrate surface has been wetted with the priming agent. Preferably, the priming agent is applied at the rate of about 0.005 to 0.035 grams per square inch, typically about 0.010 to 0.015 grams per square inch. The priming agent solution generally dries within a matter of minutes, to leave the primed surfaces ready for application of the adhesive composition.

The heat-curable polyurethane adhesive composition as described in U.S. Pat. No. 4,390,678 (referred to earlier) is a one-part system, and comprises an isocyanate-terminated prepolymer and a polyhydroxide curing agent. The isocyanate-terminated prepolymer is generally in liquid form and is formed by reacting a polyether polyol or polyester polyol with a molar excess of an polyisocyanate. Preferably, the prepolymer is formed by reacting the polyisocyanate with a polyester polyol. In order to reduce reactivity of the polyhydroxide curing agent and to prevent substantial gelling or hardening of the adhesive composition during storage, the polyhydroxide compound is preferably present as an insoluble phase in the liquid isocyanate-terminated liquid prepolymer phase.

The polyol compounds used to form the isocyanate-terminated prepolymer contain at least two hydroxyl groups attached to an organic backbone comprising an alkyl, alkylene, polyester, polyether, polyacetone or the like. Blends and mixtures of those polyol compounds may also be used. The polyol compounds can be fluid at room temperature and have a molecular weight and hydroxyl functionality which results in a prepolymer of manageable viscosity. Typically, a suitable polyol compound will have a molecular weight of less than 20,000, more typically less than 5,000. The molecular weight may be in the region of 500 to 3,000 in order to obtain optimum viscosity and reactivity. Hydroxyl functionality typically ranges from 2 to 6.

Examples of preferred polyol compounds include commercial polyoxalkylenes having at least two terminal hydroxyl groups in the molecule, such as polyethylene glycols, polypropylene glycols, or polybutylene glycols, hydroxyl-containing polyesters, hydroxyl-containing polyesteramides, polyalkylene ether glycol compounds, polyoxyalkylene compounds, castor oil, tung oil and their alkyd modifications, dihydroxy terminated polyesters produced, for example, by esterification of adipic acid, sebacic acid, and other dicarboxylic acids with long chain polyoxyalkylene glycols, and polyepsilon caprolactonediols. The most preferred hydroxyl containing compounds are the polyoxyalkylene diols or triols of appropriate molecular weight.

The polyisocyanate compounds suitable for reacting with the polyol compound to form the isocyanate-terminated prepolymer include any organic aromatic polyisocyanates having an isocyanate functionality of about two or greater and at least 1 aromatic group. The polyisocyanate may have any number of aromatic groups, the number typically ranging from 1 to 10, preferably from 2 to 4, aromatic groups. The polyisocyanate may also contain other substituents which will not substantially adversely affect the isocyanate-terminated prepolymer or the adhesive properties of the ultimately obtained, heat cured aromatic polyurethane composition. The polyisocyanate compound can also comprise a mixture of aromatic and aliphatic isocyanates.

Typical aromatic polyisocyanates include diphenylmethane diisocyanate compounds (MDI), including its isomers, diphenylmethane, 4,4'-diisocyanate, diphenylmethane 2,2'-diisocyanate, diphenylmethane 2,4' diisocyanate and mixtures thereof; toluene diisocyanate compounds (TDI), including 2,4-toluene diisocyanate, and 2,6-toluene diisocyanate and mixtures thereof; isomers of naphthalene diisocyanate, isomers of triphenylmethane triisocyanate, and mixtures thereof. Preferably, the polyisocyanate is a diisocyanate having an average functionality from about 1.5 to 3.0 where a fractional functionality can arise by mixing isocyanates of different functionalities. For optimum strength, the diisocyanate will have a functionality of 2. The preferred MDI and TDI aromatic diisocyanates are diphenylmethane 2,4'- and 4,4'-diisocyanate, and 2,6- and 2,4-toluene diisocyanate and mixtures thereof.

The polyhydroxy compound curing agent preferably comprises a solid polyhydroxy compound substantially insoluble in the liquid prepolymer which can be dispersed or suspended throughout the prepolymer phase and maintained until the adhesive is heat-activated and cured. The preferred polyhydroxy compounds are finely divided solid polyhydroxy compounds with at least two OH groups attached to an organic backbone, having melting points at or above the preferred curing temperature. Typically, to achieve the desired level of crosslinking and hardness in the cured polyurethane adhesive, the polyhydroxy compound of the separate phase will have from 2 to 6 hydroxyl groups.

The polyhydroxy compounds selected for mixing with the prepolymers should have an appropriate hydroxyl functionality and should have a melting point above the curing temperature. If during storage and before use, the melting point of the solid is exceeded, the system can begin to cure. Since temperatures of the order of 140° to 400° F. (60° C. to 204° C.) may be employed to effect curing, the preferred compounds have melting points in the range of 140°–410° F. (60°–210° C.). In general, the solid compound should be finely divided, about 325 mesh or smaller, to promote dispersion in the fluid prepolymer phase.

Examples of solid polyhydroxy compounds to be used as curing agents include commercial pentaerythritol, dipentaerythritol, tripentaerythritol, and mixtures thereof, the methyl alpha d-glucoside of corn starch, sucrose (m.p. 170° C.), lactose (m.p. 202° C.), d-mannitol (m.p. 166° C.), anhydrous sorbitol (m.p. 112° C.), dulcitol (M.P. 188.5° C.) and erythritol (m.p. 120° C.). Other solid polyhydroxy compounds, such as copolymers of vinyl esters with ethylenic unsaturated compounds having three or more ester groups replaced by hydroxyl groups can be used.

The preferred polyhydroxy compound for use as the curing agent in the adhesive composition is pentaerythritol, a crystalline, odorless, white, nonhygroscopic, practically non-volatile, tetrahydric neopentyl alcohol of the formula 2,2-bis(hydroxymethyl)-1,3-propanediol. Pentaerythriotol is available commercially, for example, as Hercules® PE-200, a product of Hercules, Incorporated. Its melting point has been reported as 260° C. to 262° C. Pentaerythritol can be used with its dimers, trimers, and other isomers, its esters and the esters of its dimers and trimers, and mixtures thereof.

The OH/NCO ratio, i.e. The ratio of OH groups in the polyhydroxide compound curing agent to NCO groups in the liquid isocyanate-terminated prepolymer is generally less than about 2:1. Preferably, the OH/NCO ratio is from about 0.5:1 to 1.8:1, and more preferably from about 0.1:1 to 1.5:1.

The adhesive composition may also contain one or more plasticizers to improve the viscosity and bubble release of the uncured adhesive and the hardness, flexual modulus, and cure time of the cured adhesive. Suitable plasticizers include phthalates, phosphates, chlorinated biphenols and polyphenols, aromatic oils, chlorinated waxes or paraffins, adipates, synthetic rubber polymers, long oil derived from linseed oils and wood resins, and polysulfite rubber.

Normally, the amount of plasticizer ranges from about 1% by weight of solids in the polyurethane to about 25% in order to obtain good dispersion of the polyhydroxy compound curing agent phase. Preferred plasticizers include N-ethyl toluene sulfonamide and diisodecylphthalate (DIDP). In addition, N-ethyl toluene sulfonamide is particularly useful as an aid in the introduction and dispersion of solids throughout the prepolymer, while DIDP works especially well to reduce viscosity.

Fillers, extenders, thickeners, catalysts, pigments, and the like can also be included in the polyurethane composition. Neutral fillers are ordinarily preferred in order to avoid gasing during storage. Highly alkaline materials may have an undesired catalytic effect. Highly acidic materials may attack the urethane or carbamate linkages in the prepolymer.

The heat curable adhesive composition is applied to the buffed surfaces of the primed casing and the composite tread. The adhesive should be applied in a manner to adequately "wet" both surfaces filling all interstices in a manner to provide an average bond line thickness of 1 to 20 thousandths of an inch, preferably 3 to 10 thousandths of an inch. The adhesive is generally in form of a thixotropic liquid, and is applied by spreading over the entire surfaces to be contacted. The desired average bond line thickness can be achieved when the adhesive is applied at a rate of 0.1 to 0.8 grams per square inch, for example 0.2 to 0.6 grams per square inch.

The reteading process is now carried out by mating the adhesive-coated surfaces of the composite tread and the casing. The ends of the tread are then stapled together to hold in place on the casing.

The following procedure is then followed when either the cushion or polyurethane bonding approach is used. A perforated polymeric film material, for example polyethylene, is applied to the outer surface of the tread, and the tire is "stitched" by applying pressure to the tread using rollers or the like while the tire is rotated. The stitching process more evenly distributes the adhesive between the casing and the tread.

A tire tread retaining means, usually a perforated tire tube, is then stretched onto the tire over the polyethylene film to hold the tread in place during the curing process, especially at the edges of the tread. Obtaing a good bond at the edges is important in that it reduces the incidence of edge-lifting of the tread from the casing during use.

The casing/tread assembly is then placed in a curing envelope and subjected to heat and pressure to cure the adhesive composition. The function of the polymeric film is to prevent any adhesive which may exude from the sides of the tire from contacting and adhering to the inner surface of the curing envelope or to the inner surface of the perforated tire tube. Typically, unless the tread is devoid of any tread pattern (sometimes referred to as "Build-Up" or "Slick"), pressure (about 70 PSI) is introduced under the envelope to force the tread onto the tire and facilitate the bonding.

The curing temperature, as noted earlier, is typically within the range of 140°–400° F., and is typically 210° F.–250° F. (98°–121° C.). Normally, no significant curing is carried out at temperatures below 140° F. (60° C.) and rarely is the curing temperature as low as 185° F. (85° C.).

The curing is preferably carried out under increased pressure, typically at a relative pressure of about 80 PSI to 100 PSI, for example 85 to 90 PSI. The time taken to effect the curing will depend on tread thickness, temperature and pressure. Typically, for a moderate tread thickness (e.g. about ⅜"), the cure time is about 3 hours when the cure temperature is about 210° F. and the relative pressure is 85 PSI.

After the curing process is completed, the heating is stopped and the pressure on the curing envelope is returned to atmospheric. The tire is removed from the curing envelope and the perforated tube and polyethylene film removed. If build-up is used as the tread, the edges of the tread on the tire are then buffed at about 45 degrees to conform the edges to the external contour of the casing. Moreover, in many applications, it may be necessary to carve a series of grooves into the build-up.

This is performed to facilitate traction and is typically carried out using a heated knife or grooving iron.

We claim:

1. A method for forming a composite elastomer tire tread, said method comprising the steps of:
   providing a two-part mold comprising a first mold part and a second mold part, said first mold part comprising a generally flat mold surface, said second mold part containing a tire thread mold;
   placing a rubber sheet in said first mold part in contact with said generally flat mold surface;
   closing said first and second mold parts to form a mold chamber;
   introducing a heat curable liquid elastomer composition into said chamber; and
   curing said liquid composition to form said composite tire thread.

2. A method according to claim 1, wherein said curing is carried out at elevated temperature.

3. A method according to claim 2, wherein said elevated temperature is about 212° F. to 230° F.

4. A method according to claim 1, wherein said curing is carried out at elevated pressure.

5. A method according to claim 4, wherein said pressure is about 80 to 90 PSI.

6. A method according to claim 1, wherein said rubber sheet is about 1/16 to ½ inch thick.

7. A method according to claim 6, wherein said rubber sheet is about ⅛ inch thick.

8. A method according to claim 1, wherein said curing is carried out for about three hours.

9. A method according to claim 1, wherein the curable elastomer composition is a polyurethane composition.

10. A method for forming a composite elastomer tire thread, said method comprising the steps of:
    placing a thin rubber sheet in a first generally flat mold part of a two-part mold, a second mold part containing a tire thread mold;
    closing said first and second mold parts to form a mold chamber;
    introducing a liquid curable elastomer mixture into said chamber; curing said curable mixture in said mold; and
    post-curing the cured composite tread.

11. A method according to claim 10, wherein said second mold part is below said first mold part during introduction of said mixture into said chamber.

12. A method according to claim 10, wherein said liquid curable elastomer is introduced into said second mold part prior to closing the mold.

13. A method according to claim 10, wherein said mold is inverted after introduction of said mixture whereby said second mold part is above said first mold part during curing.

14. A method according to claim 10, wherein said curing is carried out at an elevated temperature.

15. A method according to claim 14, wherein said elevated temperature is about 212° F. to 230° F.

16. A method according to claim 10, wherein said curing is carried out at elevated pressure.

17. A method according to claim 16, wherein said elevated pressure is about 80 to 90 PSI.

18. A method according to claim 10, wherein said curable elastomer composition is a polyurethane composition.

19. A method according to claim 10, wherein said rubber sheet is about 1/16 to ½ inch thick.

20. A method according to claim 19, wherein said rubber sheet is about ⅛ inch thick.

* * * * *